March 31, 1931.  W. McGIBBON  1,798,265
FLOWER BED BORDER
Filed Aug. 15, 1929
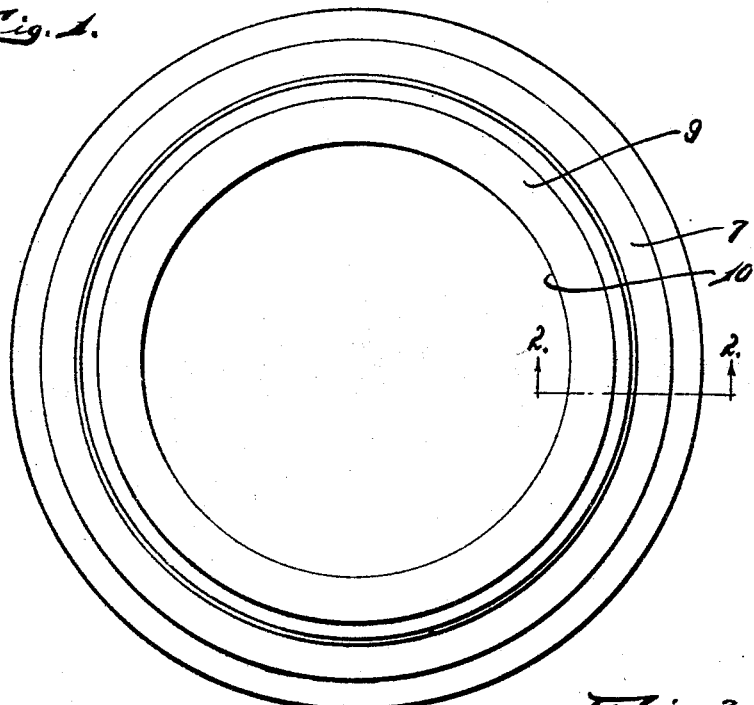
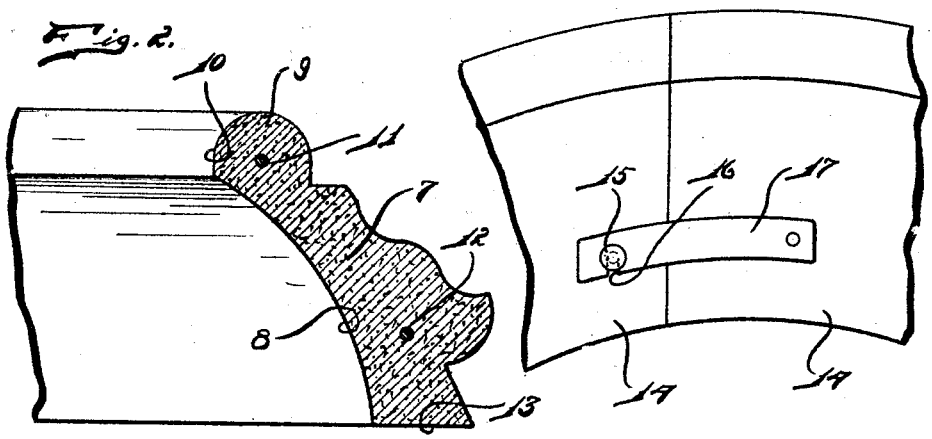
INVENTOR.
William McGibbon
BY
Thos. S. Donnelly
ATTORNEY.

Patented Mar. 31, 1931

1,798,265

UNITED STATES PATENT OFFICE

WILLIAM McGIBBON, OF DETROIT, MICHIGAN

FLOWER-BED BORDER

Application filed August 15, 1929. Serial No. 386,027.

My invention relates to a new and useful improvement in a flower bed border and has for its object the provision of a flower bed border formed from plastic material so arranged and constructed so as to resist the wear to which it would be subjected by the elements and to provide an ornamental border for the flower bed.

It is another object of the invention to provide a flower bed border of this class which will be simple in structure, economical of manufacture and highly efficient in use.

Another object of the invention is the provision of a border of this class which, while firmly seated on the ground, will permit the necessary movement of the ground in response to freezing and thawing without any damaging effects on the border itself.

Other objects will appear hereinafter.

The invention consists in the combination and arrangement of parts hereinafter described and claimed.

The invention will be best understood by a reference to the accompanying drawings which form a part of this specification, and in which, Fig. 1 is a top plan view of the invention.

Fig. 2 is an enlarged sectional view taken on line 2—2 of Fig. 1.

Fig. 3 is a fragmentary perspective view of a modified form of the invention.

The invention is adapted for forming a border and abutment for the edge of a flower bed. It is preferred to form the border from concrete although it may be formed from any other suitable plastic material which will lend itself to economical manufacture.

The invention comprises a main body 7 having its inner face 8 formed arcuate or on a spherical contour and adapted to engage the outer surface of the flower bed which is ordinarily raised above the level of the lawn or other plane of the earth in which the flower bed is formed. A bead 9 is formed on the upper edges of substantially cylindrical contour, the inner face 10 of the bead being directed axially of the main body 7. By forming the surface 8 arcuate as described, a protection is afforded to the border against the elements preventing the cracking or destruction of the same when the earth freezes. The border will be permitted to rise when the earth pushes outwardly because of the changing of the elements. Reinforcements 11 and 12 are projected in the main body, these reinforcements being formed from iron or other reinforcing material so as to prevent cracking of the main body 7. The end 13 is formed flat and lies in a plane at right angles to the axis of the main body so as to securely support the border in position.

In Fig. 3 I have shown the border consisting of a plurality of sections 14 projecting outwardly from one of which is a stud 15 engageable in a notch 16 of the swingable arcuate latch bar 17. By this latch mechanism, the abutting sections are secured together and the device is adapted for use where the flower bed is formed around the root of a tree or other body which would prevent a single uninterrupted body to be used as a border for the flower bed. With a flower bed border of this class, an ornamental and attractive appearance may be effected and at the same time due to the conservation of moisture resulting from the use of the flower bed, more efficient results in the raising of flowers can be accomplished.

While I have illustrated and described the preferred forms of construction, I do not wish to limit myself to the precise details of structure shown but desire to avail myself of such variations and modifications as come within the scope of the appended claims.

Having thus described my invention, what I claim as new and desire to secure by Letters Patent is:

1. A border forming device of the class described, comprising: a main body portion formed from hardened plastic material having the inner surface thereof formed arcuate for engaging an earth mound on which positioned; reinforcement members projected through said main body; and a bead formed on the upper edge of said main body and extending around the same, said bead being substantially semi-cylindrical in cross section.

2. A border forming device of the class described, comprising: a circular main body portion formed from hardened plastic material having the inner faces thereof formed arcuate from top to bottom for engaging an earth mound on which positioned; a bead formed on the upper edge of said main body extending around the same, said bead being substantially semi-cylindrical in cross section and providing an increased thickness of body at the upper edge.

3. A border forming device of the class described, comprising: a circular main body portion formed from hardened plastic material having the inner face thereof formed arcuate from top to bottom for engaging an earth mound on which positioned; a bead formed on the upper edge of said main body extending around the same, said bead being substantially semi-cylindrical in cross section and providing an increased thickness of body at the upper edge; and a reinforcement member extended through said body inwardly of said bead.

In testimony whereof I have signed the foregoing specification.

WILLIAM McGIBBON.